United States Patent
Tan et al.

(10) Patent No.: US 12,155,654 B2
(45) Date of Patent: Nov. 26, 2024

(54) METHODS, DEVICES, APPARATUSES AND COMPUTER READABLE MEDIA FOR CONNECTING TO NETWORK

(71) Applicant: Nokia Solutions and Networks Oy, Espoo (FI)

(72) Inventors: Jun Tan, Bellevue, WA (US); Dennis Edwards, Issaquah, WA (US); Ye Luo, Shanghai (CN); Bangliang Zhang, Shanghai (CN); Wenqin Huang, SuZhou (CN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 17/136,161

(22) Filed: Dec. 29, 2020

(65) Prior Publication Data

US 2021/0211423 A1    Jul. 8, 2021

(30) Foreign Application Priority Data

Jan. 7, 2020  (CN) ........................ 202010015639.2

(51) Int. Cl.
*G06F 7/04* (2006.01)
*H04L 9/40* (2022.01)

(52) U.S. Cl.
CPC ........ *H04L 63/0876* (2013.01); *H04L 63/083* (2013.01)

(58) Field of Classification Search
CPC ....... G06F 21/44; G06F 21/73; H04L 9/0866; H04L 63/0876; H04L 63/083;
(Continued)

(56) References Cited

U.S. PATENT DOCUMENTS

| 9,935,887 B1* | 4/2018 | Maharia ................ H04L 47/365 |
| 2005/0246419 A1* | 11/2005 | Jaatinen .............. H04L 63/0407 |
| | | 709/204 |

(Continued)

FOREIGN PATENT DOCUMENTS

| CN | 101998575 A | 3/2011 |
| CN | 102088668 A | 6/2011 |

(Continued)

OTHER PUBLICATIONS

Kong et al., IEEE802.1x of Protocol Analysis and Improvement, Aug. 22, 2010, IEEE, pp. V3-282-V3-285. (Year: 2010).*

(Continued)

*Primary Examiner* — Philip J Chea
*Assistant Examiner* — Jenise E Jackson
(74) *Attorney, Agent, or Firm* — HARNESS, DICKEY & PIERCE, P.L.C.

(57) ABSTRACT

A method includes receiving, at a first network device from a second network device, a request to probe a network connected to the first network device. The request includes an identification of the second network device. The method also includes determining whether the second network device is authenticated to the network based on the identification. The method further includes in accordance with a determination that the second network device is authenticated to the network, causing a response to the received request to be transmitted to the second network device to enable a connection of the second network device to the network. In this way, the enrollee network device can be onboarded to the existing network in an easy and time-saving manner.

28 Claims, 7 Drawing Sheets

(58) Field of Classification Search
CPC ... H04W 12/009; H04W 12/06; H04W 12/71; H04W 12/76; H04W 12/73
See application file for complete search history.

(56) References Cited

U.S. PATENT DOCUMENTS

| | | | | |
|---|---|---|---|---|
| 2010/0165875 | A1* | 7/2010 | Kneckt | H04W 8/005 370/254 |
| 2012/0147777 | A1* | 6/2012 | Arashin | H04W 72/02 370/252 |
| 2012/0177022 | A1* | 7/2012 | Ichikawa | H04W 48/08 370/338 |
| 2013/0155933 | A1* | 6/2013 | Kneckt | H04W 48/16 370/312 |
| 2015/0359023 | A1* | 12/2015 | Stojanovski | H04W 52/0216 370/329 |
| 2016/0044596 | A1* | 2/2016 | Iwai | H04L 5/0048 370/311 |
| 2016/0080889 | A1* | 3/2016 | Viswanathan | H04W 12/50 455/419 |
| 2016/0269176 | A1* | 9/2016 | Pang | H04L 9/083 |
| 2017/0013449 | A1* | 1/2017 | Raman | H04W 12/06 |
| 2017/0094704 | A1* | 3/2017 | Yu | H04W 76/14 |
| 2017/0244732 | A1* | 8/2017 | Manjunath | H04L 63/1416 |
| 2018/0054845 | A1* | 2/2018 | Lee | H04W 48/14 |
| 2018/0077111 | A1* | 3/2018 | Pang | H04L 61/5061 |
| 2018/0288458 | A1* | 10/2018 | Kolekar | H04W 4/08 |
| 2019/0090291 | A1 | 3/2019 | Jain | |
| 2019/0104463 | A1* | 4/2019 | Khoury | H04L 41/12 |
| 2019/0200405 | A1 | 6/2019 | Gupta et al. | |
| 2019/0306710 | A1* | 10/2019 | Cammarota | H04W 12/0431 |
| 2019/0357080 | A1* | 11/2019 | Shanbhag | H04W 12/088 |
| 2020/0336898 | A1* | 10/2020 | Jiang | H04L 63/18 |
| 2020/0359349 | A1* | 11/2020 | Duo | H04W 8/005 |
| 2021/0007159 | A1* | 1/2021 | Jain | H04W 48/14 |
| 2021/0045052 | A1* | 2/2021 | Nellore | H04W 48/20 |
| 2021/0385778 | A1* | 12/2021 | Ahn | H04W 48/08 |

FOREIGN PATENT DOCUMENTS

| | | |
|---|---|---|
| CN | 106171038 A | 11/2016 |
| CN | 106535191 A | 3/2017 |
| CN | 107371160 A | 11/2017 |
| CN | 109246656 A | 1/2019 |
| WO | WO-2019/169626 A1 | 9/2019 |

OTHER PUBLICATIONS

Ramezan et al., A Survey of Secure Routing Protocols in Multi-Hop Cellular Networks, IEEE, Jul. 25, 2018, pp. 3510-3541. (Year: 2018).*
Second Chinese Office Action and Search Report dated Mar. 17, 2023 for corresponding Chinese Application No. 202010015639.2.
Office Action for Chinese Application No. 202010015639.2 dated Aug. 17, 2022.
Chinese Office Action and Search Report dated Jun. 28, 2023 for corresponding Chinese Application No. 202010015639.2.
Chinese Office Action for Chinese Application No. 202010015639.2 mailed Dec. 19. 2023.

* cited by examiner

METHODS, DEVICES, APPARATUSES AND COMPUTER READABLE MEDIA FOR CONNECTING TO NETWORK

CROSS-REFERENCE TO RELATED APPLICATIONS

The present application claims priority under 35 U.S.C. § 119 to Chinese Patent Application No. 202010015639.2, filed on Jan. 7, 2020, in the Chinese Patent Office, the entire contents of each of which are hereby incorporated by reference.

FIELD

Embodiments of the present disclosure generally relate to the fields of computer network and communication and in particular, to methods, devices, apparatuses and computer readable media for connecting to network.

BACKGROUND

In a wireless network such as Wireless-Fidelity (Wi-Fi), a mesh network can be established based on multiple access points (Multi-AP). The Multi-AP overlay mesh network runs on top of a Layer-2 (L2) convergence layer with expanded support for Wi-Fi devices. A Multi-AP network may comprise two types of logical entities: one Multi-AP controller and one or more Multi-AP agents. An onboarding procedure is a procedure by which a Multi-AP agent gains L2 connectivity onto a Multi-AP network through Wi-Fi or wired connectivity.

SUMMARY

In general, example embodiments of the present disclosure provide a solution for connecting to network.

In a first aspect, there is provided a first network device. The first network device comprises at least one processor; and at least one memory including computer program codes; the at least one memory and the computer program codes are configured to, with the at least one processor, cause the first network device to receive from a second network device a request to probe a network connected to the first network device, the request comprising an identification of the second network device; determine whether the second network device is authenticated to the network based on the identification; and in accordance with a determination that the second network device is authenticated to the network, cause a response to the received request to be transmitted to the second network device to enable a connection of the second network device to the network.

In a second aspect, there is provided a second network device. The second network device comprises at least one processor; and at least one memory including computer program codes; the at least one memory and the computer program codes are configured to, with the at least one processor, cause the second network device to upon being powered on, broadcast a request to probe a network connected to a first network device, the request comprising an identification of the second network device; and receive from the first network device a response to the transmitted request to enable a connection of the second network device to the network, the response transmitted in accordance with a determination that the second network device is authenticated to the network.

In a third aspect, there is provided a method of communication. The method comprises receiving, at a first network device from a second network device, a request to probe a network connected to the first network device, the request comprising an identification of the second network device; determining whether the second network device is authenticated to the network based on the identification; and in accordance with a determination that the second network device is authenticated to the network, causing a response to the received request to be transmitted to the second network device to enable a connection of the second network device to the network.

In a fourth aspect, there is provided a method of communication. The method comprises upon being powered on, broadcasting at a second network device a request to probe a network connected to a first network device, the request comprising an identification of the second network device; and receiving from the first network device a response to the transmitted request to enable a connection of the second network device to the network, the response transmitted in accordance with a determination that the second network device is authenticated to the network.

In a fifth aspect, there is provided an apparatus for communication. The apparatus comprises means for performing the method according to the above third aspect.

In a sixth aspect, there is provided an apparatus for communication. The apparatus comprises means for performing the method according to the above fourth aspect.

In a seventh aspect, there is provided a non-transitory computer readable medium storing machine-executable instructions thereon that, when executed, cause a machine to perform at least the method according to the above third aspect.

In an eighth aspect, there is provided a non-transitory computer readable medium storing machine-executable instructions thereon that, when executed, cause a machine to perform at least the method according to the above fourth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
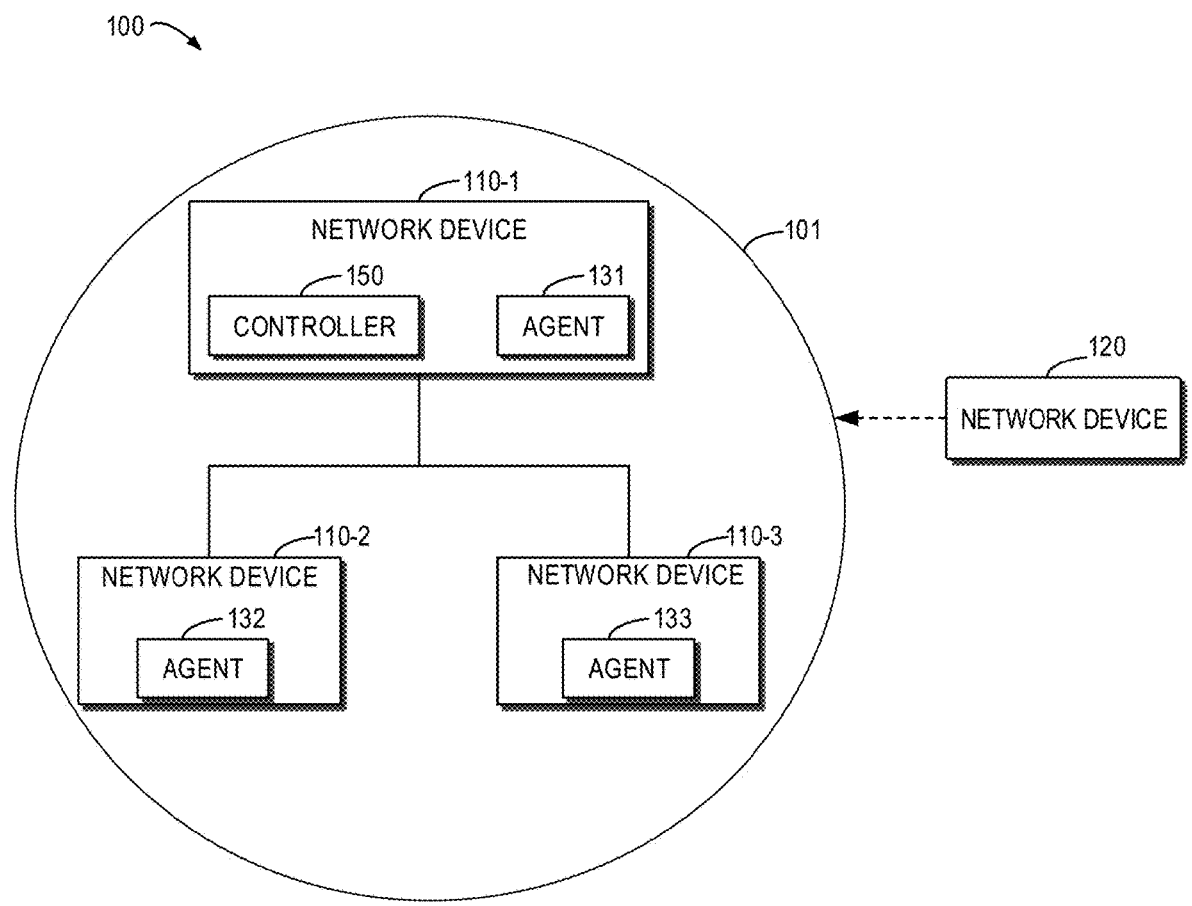
FIG. 1 illustrates an example communication environment in which embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "another embodiment" is to be read as "at least one further embodiment." The terms "first", "second" and so on can refer to same or different objects. Other definitions, either explicit or implicit, may be included below.

As used herein, the term "determining" covers a wide variety of actions. For example, "determining" may include calculating, computing, processing, deriving, investigating, looking up (e.g., looking up in a table, database, or another data structure), ascertaining, and the like. In addition, "determining" may include receiving (e.g., receiving information), accessing (e.g., accessing data in a memory), and the like. In addition, "determining" may include parsing, selecting, choosing, establishing, and the like.

As used in this application, the term "circuitry" may refer to one or more or all of the following:

(a) hardware-only circuit implementations (such as implementations in only analog and/or digital circuitry) and (b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "network device" may generally refer to any device connected to a computer network or a communication network, including, but not limited to, a computer, a server, a hub, a switch, a bridge, a router, a gateway, a network interface cards, a wireless access point, printers and modems, a fiber optic transceiver, a fiber optic cable, and the like. In some cases, a network device may also be referred to as a network node or a node. In some example embodiments, the same "network device" may serve as network devices with different functions in the network in different scenarios.

FIG. 1 shows an example communication environment 100 in which embodiments of the present disclosure can be implemented. As shown in FIG. 1, the network 101 includes network devices 110-1, 110-2 and 110-3 which are connected together through communication connections (such as, Wi-Fi). These network devices 110-1, 110-2 and 110-3 have been connected to the network 101. For example, each of the network devices 110-1, 110-2 and 110-3 has gained L2 connectivity onto the network 101 through for example Wi-Fi.

In some example embodiments, the network 101 may be a local area network (LAN). In some example embodiments, the network 101 may be implemented as a mesh network, such as a wireless mesh network. In general, a mesh network refers to a network in which the transmission of information and control instructions is implemented by dynamic routing between network nodes. In such a network, when a node in the network topology fails or cannot serve, this network architecture allows the use of "hop" to form a new route and delivery the information to the destination.

In the example of FIG. 1, the network 101 is shown as a Multi-AP network and there are two types of logical entities: one Multi-AP controller and one or more Multi-AP agents. The controller 150 is implemented at the network device 110-1, while the agents 131, 132 and 133 are implemented at the network devices 110-1, 110-2 and 110-3, respectively. As such, the network device 110-1 serves as a controlling device for the network devices 110-2 and 110-3. It is to be understood that the controller may be implemented at any of the network devices 110-1, 110-2 and 110-3. The topology of the network 101 as shown in FIG. 1 is merely an example without any limitation. The network 101 can implement any suitable network topology, including but not limited to a star topology, a chain topology and a hybrid topology.

As used herein, the term "agent" or "Multi-AP agent" may refer to a Multi-AP compliant logical entity that executes AP control functions and provides Multi-AP specific control information. The term "controller" or "Multi-AP controller" may refer to a Multi-AP compliant logical entity that implements logic for controlling the operation of the Multi-AP network.

In the example environment 100, the network devices 110-1, 110-2 and 110-3 have been connected to the network, for example have gained the L2 connectivity onto the network 101. Another network device 120, which may be a newly brought device, may intend to connect to the network 101 in order to provide communication service to the end user together with the network devices 110-1, 110-2 and 110-3. The procedure by which the network device 120 is configured to connect to the network 102 may be referred to as "onboarding".

It is to be understood that the number of network devices as shown in FIG. 1 is only for purpose of illustration without suggesting any limitation. There may be less or more network devices which have been connected to the network 101. In some example embodiments, there may be only one network device having been connected to the network 101. For example, only the network device 110-1 is connected to the network 101. As used herein, the network devices 110-1, 110-2 and 110-3 may be collectively referred to as "network devices 110" or individually referred to "the network device 110". The network device 110 may also be referred to as an existing network device or a first network device herein. The network device 120 may be referred to as an enrollee network device or a second network device. One or more of the network device 120 and the network devices 110-1, 110-2 and 110-3 may be a Multi-AP device.

As mentioned above, an onboarding procedure is required to onboard the enrollee network device onto the network. There is only one mandatory onboarding method: 1905 Push Button Configuration method in the Multi-AP v1.0 specification definition. According to this onboarding method, the end user is required to trigger the Wi-Fi Protected Setup (WPS) push button event to start the onboarding procedure.

Conventionally, there are two approaches to trigger the WPS push button event, that is, approaches of physical WPS button and software WPS button. In the approach of physical WPS button, a physical button is provided in the printed circuit board (PCB) of the network device for WPS function. To trigger the WPS push button event, the end user is required to press the physical buttons of both the existing network device and the enrollee network device. This approach not only causes the hardware cost, but also does not allow pre-deployment, since the onboarding device with the Multi-AP agent must be at hand of the end user.

In the other approach of software WPS button, the end user is required to trigger the WPS push button event in the WEB graphical user interface (GUI) or APP for WPS function. In this approach, the end user needs to have the knowledge of the enrollee network device, for example the serial number or other identification information of the enrollee network device. User experience is thus reduced. This approach also requires the end user to have the enrollee network device at hand and does not allow pre-deployment.

The above conventional approaches involve too much intervention of the end user, which causes the onboarding procedure to be time consuming and also a poor use experience. Therefore, there is a need for a mechanism to onboard the network device easily and conveniently so as to ensure availability in the network (e.g., the Multi-AP network) that is the critical requirement for the customer.

According to embodiments of the present disclosure, there is provided a solution for connecting to the network. This solution may be used to for example identify which Multi-AP device with Multi-AP agent should gain the L2 connectivity onto the Multi-AP network. The solution proposed herein may also be referred to as "Zero Touch onboarding". In the Zero Touch onboarding solution, once the enrollee network device (for example, a Multi-AP Device with a Multi-AP agent) is powered on in the signal range of an existing network (e.g., a Multi-AP network), the enrollee network device may broadcast a request to probe the network (e.g., a probe request) and the request may include an identification of the enrollee network device. One or more existing network devices may receive the request and determine whether the enrollee device is authenticated to the network based on the identification. For example, the one or more existing network devices may compare the identification with local authentication information indicating devices having been authenticated to the network.

If it is determined that the enrollee network device is authenticated to the network, for example if the identification is matched with the authentication information, at least one of the one or more existing network device will respond to the enrollee network device to enable a connection of the enrollee network device to the network. There are different ways to onboard the enrollee network device onto the network. As an example, the existing network device and the enrollee network device may perform a connection setup procedure, for example, trigger the software WPS event and perform the standard procedure in the Multi-AP specification. As another example, the enrollee network device may be associated to the backhaul Basic Service Set (BSS) of the existing network with a backhaul credential in a response from the existing network device. If it is determined that the enrollee network device is not authenticated to the existing network, the end user still can trigger the WPS push button event to start the standard WPS onboarding procedure.

In the Zero Touch onboarding solution, the enrollee network device, e.g. a Multi-AP device, can be onboarded to the existing network in an easy and time-saving manner. In this way, intervention from the end user is much reduced compared to the conventional approaches and user experience can thus be improved.

Principle and implementations of the present disclosure will be described in detail below with reference to FIG. 2, which illustrates a flowchart illustrating an example process 200 for connecting to network according to some embodiments of the present disclosure. For the purpose of discussion, the process 200 will be described with reference to FIG. 1. The process 200 may involve the network device 110 and the terminal device 120 as illustrated in FIG. 1.

In the example process 200, the network device 110 may snoop 205 a broadcast request within the signal range of the network 101. For example, the existing network device 110-1 with the controller 150 and the agent 131 may put itself and other existing network devices (for example, the network device 110-2 with agent 132 and the network device 110-3 with agent 133) in a constant monitor mode to snoop a broadcast probe request. Upon being powered on, the enrollee network device 120 broadcasts 210 a request to probe the network 101 connected to the existing network device 110 and the request includes an identification of the network device 120. For example, the network device 120 may broadcast 210 a probe request. In some example embodiments, the identification of the network device 120 may be comprised in a vendor specific information element (IE) of the request.

Different types of information which can indicate the identity of a network device can be used as the identification. In some example embodiments, the identification of the network device 120 may comprise a group serial number of the network device 120, and/or a device serial number of the network device 120. The group serial number can be applied in the packet box product which has more than one device. Thus, a group serial number may be used to identify a group of network devices, which may be sold as a suite or otherwise associated to each other. The group serial number for a network device may be configured before the network device leaves the factory where it was manufactured. As an example, the network device 120 may broadcast 210 a probe request with its group serial number and device serial number in the vendor specific IE of the probe request.

After receiving the request to probe the network 101 from the enrollee network device 120, the existing network device 110 determines 215 whether the enrollee network device 120 is authenticated to the network 101 based on the identification comprised in the request. The network device 110 may employ any suitable approach to determine whether the network device 120 is authenticated to the network 101. For example, the network device 110 may determine whether the identification of the network device 120 satisfies a predefined rule or falls in a predetermined range.

In some example embodiments, the network device 110 may obtain authentication information and the authentication information may comprise a set of identifications of devices which have been or can be authenticated to the network 101. The authentication information may be generated at least partially by scanning of code associated with a device (for example, a QR code on the device) or enter of a serial number of a device. The network device 110 may then determine whether the network device 120 is authenticated to the network 101 by comparing the identification of the network device 120 with the authentication information. If the identification of the network device 120 matches one of the set of identifications in the authentication information, the network device 110 may determine that the network device 120 is authenticated to the network 101.

The existing network device 110 may authenticate the enrollee network device 120 based on group serial number. In this case, the authentication information may comprise configured group serial numbers. For example, the authentication information may comprise the group serial number of each of the existing network devices 110-1, 110-2 and 110-3. If the enrollee network device 120 belongs to the same group as one of the existing network devices 110-1, 110-2 and 110-3, for example the network device 110-2, the group serial number of the network device 120 will match with the authentication information.

Alternatively, or in addition, the existing network device 110 may authenticate the enrollee network device 120 based on device serial number. In this case, the authentication information may comprise configured device serial numbers. The device serial number of a potential enrollee network device (for example, a network device newly brought by the end user) can be configured to the existing network device(s) by various ways, for example via Mobile App, WEB-GUI or Cloud. As an example, for Mobile App, there may be two ways to configure the serial number: scan a QR code labeled in the enrollee network device which includes the serial number, or directly input the serial number. If the device serial number of the network device 120 is included in the authentication information, for example if the QR code of the network device 120 has been scanned, the identification comprised in the request will match with the authentication information.

The authentication information may be permanently or semi-permanently stored in the network device 110-1 with the controller 150 and the network device 110-1 may distribute the authentication information to other existing network device(s), for example, each of the network devices 110-2 and 110-3. As such, each of the network devices 110-1, 110-2 and 110-3 can independently determine whether the enrollee network device 120 is authenticated to the network 101. It is to be understood that the group serial number and the device serial number can be used separately or in combination. In such example embodiments, the network devices relying on the proposed authentication approaches can be pre-deployed before delivered to the end user.

Figure 2:
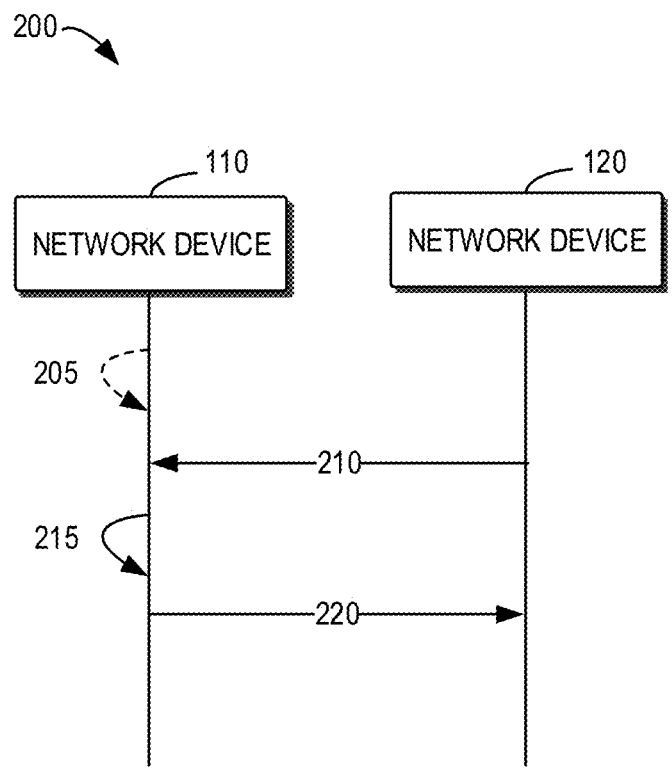
FIG. 2 illustrates a flowchart illustrating an example process for connecting to network according to some embodiments of the present disclosure.

Still refer to FIG. 2. If the network device 110 determines that the network device 120 is not authenticated to the network 101, for example, if the identification of the network device 120 is not matched with the authentication information, the network device 110 may discard or ignore the request. If the network device 110 determines that the network device 120 is authenticated to the network 101, for example, if the identification of the network device 120 is matched with the authentication information, the network device 110 causes a response to the received request transmitted 220 to the network device 120 to enable a connection of the network device 120 to the network 101. For example, a probe response is transmitted 220 to the network device 120.

In some example embodiments, each existing network device 110 which has received the request may transmit the response at least including the identification (for example, the serial number) of the network device 120, for example in the credential mode as described below with reference to FIG. 4. If there is only one existing network device 110 within the network 101, this existing network device 110 will transmit the response.

In some example embodiments, the existing network devices 110-1, 110-2 and 112-3 may coordinate to select a particular existing network device to respond to the enrollee network device. For example, the existing network devices 110-1, 110-2 and 112-3 may coordinate to identify which existing network device is best for the enrollee network device 120. Then the selected (for example, the best) existing network device may transmit the response with its identification and the identification of the network device 120 to the network device 120. For example, the selected existing network device may transmit the probe response with its device serial number and the device serial number of the network device 120 in the vendor specific IE. Coordination of the existing network devices may be based on the signal qualities or intensities received at the existing network devices, for example based on the Received Signal Strength Indications, RSSIs. In the case where the software WPS event will be triggered as described below with reference to FIG. 3, the coordination of the existing network devices can help to avoid the issue of WPS overlap among multiple devices.

An example process for coordination of the existing network devices is now described. Upon determining that the network device 120 is authenticated to the network 101, the network device 110-2, which is under control of the network device 110-1, may report to the network device 110-1 that the request from the enrollee network device 120 has been received, for example via an indication. The network device 110-2 may further report information concerning the signal quality or intensity (e.g., RSSI) to the network device 110-1. Any other existing network device which has authenticated the network device 120 may report to the network device 110-1 similarly.

The network device 110-1 may determine the network device which has received the request and connected to the network 101 as a candidate network device. Then, the network device 110-1 may select a target network device from the candidate network device(s) and the network device 110-1 per se (if the request is received at the network device 110-1) to respond to the network device 120. The selection may be based on the signal qualities or intensities for receiving the request by each network device. Subsequently, the network device 110-1 may cause the selected target network device to transmit the response. For example, if the network device 110-2 is selected, the network device 110-1 will instruct or otherwise notify the network device 110-2 to respond to the network device 120. The network device 110-2 may transmit the response to the enrollee network device 120 and perform the subsequent procedure to onboard the network device 120 onto the network 101.

Various ways can be employed to complete onboarding of the enrollee network device 120. As an example, a connection setup procedure such as a WPS procedure may be performed between the existing network device 110 and the enrollee network device 120. As another example, a credential associated with the network 101 (for example, a backhaul credential) may be provided to the enrollee network device 120. For purpose of discussion without any limitation, the mode in which a WPS event is triggered may be referred to as WPS event mode and the mode in which the credential for backhaul is utilized may be referred to as credential mode. These two example modes are now described in detail with reference to FIGS. 3 and 4.

Figure 3:
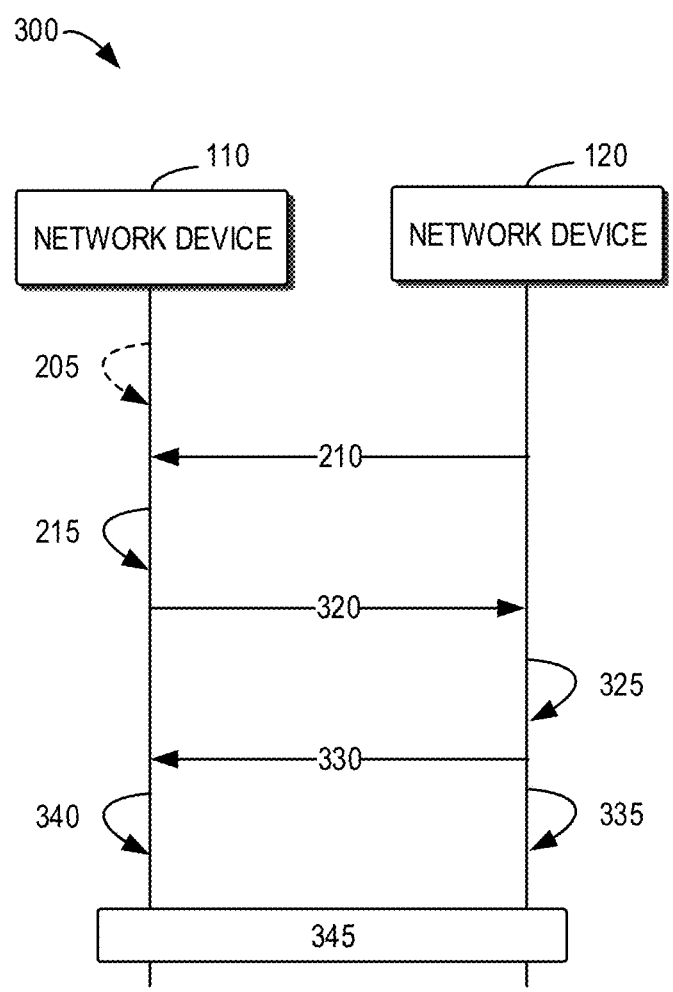
FIG. 3 illustrates a flowchart illustrating an example process for WPS event mode according to some embodiments of the present disclosure.

Reference is now made to FIG. 3, which shows a flowchart illustrating an example process 300 for WPS event mode according to some embodiments of the present disclosure. For the purpose of discussion, the process 300 will be described with reference to FIG. 1. The process 300 may involve the network device 110 and the terminal device 120 as illustrated in FIG. 1. It is to be understood that in the case of coordination of existing network devices, the network device 110 involved in the process 300 is the one of the existing network devices 110-1, 110-2 and 110-3 which is selected to respond to the network device 120.

In the example process 300, the actions with the same reference signs (205, 210, 215) as those in FIG. 2 are similar with the corresponding actions described above with reference to FIG. 2 and thus description thereof will not be repeated. The network device 110 transmits 320 to the network device 120 the response including the identification of the network device 120 and a further identification of the network device 110. For example, the network device 110 may transmit 320 a probe response with its device serial number and the device serial number of the network device 120 in the vendor specific IE.

After receiving the response, the network device 120 determines 325 whether the response matches its identification, for example its device serial number. If the response matches its identification, or in other words, if the response comprises the identification of the network device 120, the network device 120 transmits 330 a further request to the network device 110, and the further request includes the identification of the network device 120 and the identification of the network device 110. For example, the network device 120 may transmit 330 another probe request which includes the device serial numbers of the network device 110 and the network device 120 in the vendor specific IE.

As such, 3-time handshake is finished. The network device 120 may trigger 335 the software WPS event. After receiving the further request which comprises the identification (for example, the device serial number) of the network device 110, the network device 110 may also trigger 340 the software WPS event. Subsequently, a standard WPS onboarding procedure is performed 345 between the existing network device 110 and the enrollee network device 120. Such a WPS onboarding procedure may include (WPS) authentication request/response to fronthaul, (WPS) authentication/association request/response process, transmission of messages M1 to M8, transmission of (WPS) Deauth message, association request/response to backhaul BSS, AP auto configuration search from the network device 120 to the network device 110, AP auto configuration response from the network device 110 to the network device 120, transmission of AP auto configuration Wi-Fi simple configuration (WSC) M1 from the network device 120 to the network device 110 and transmission of AP-Auto configuration WSC M2(s) w/Multi-AP extension sub-element from the network device 110 to the network device 120.

In this way, the enrollee network device is onboarded to the existing network by means of the standard WPS onboarding procedure without the end user pressing a physical button or triggering the WPS event via an APP or GUI. Moreover, as mentioned above, if the coordination of the existing network devices is applied in this mode, the issue of WPS overlap among multiple devices can be avoided.

Figure 4:
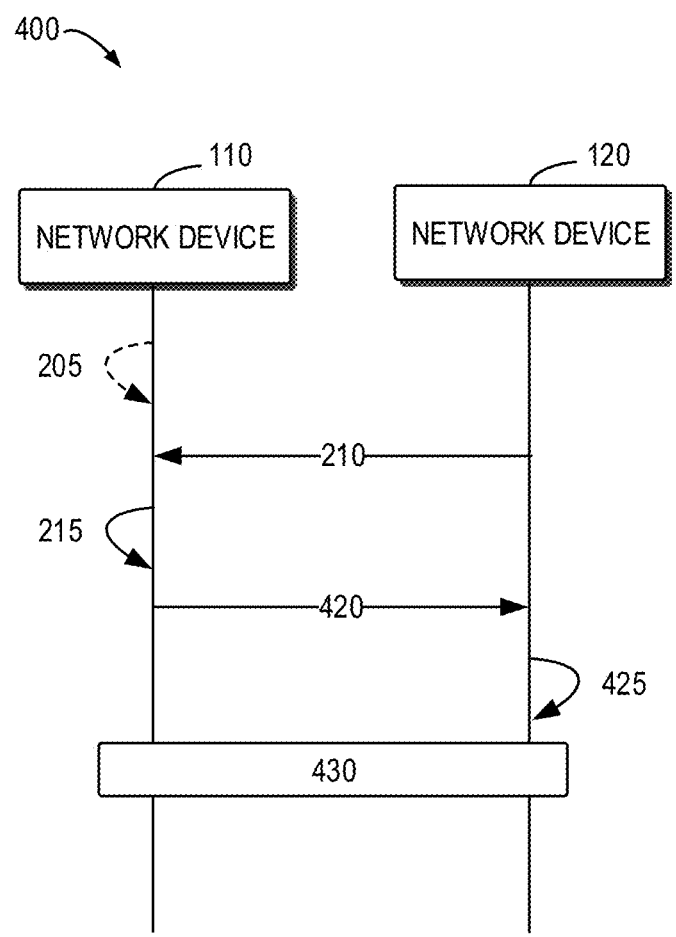
FIG. 4 illustrates a flowchart illustrating an example process for credential mode according to some embodiments of the present disclosure.

Reference is now made to FIG. 4, which shows a flowchart illustrating an example process 400 for the credential mode according to some embodiments of the present disclosure. For the purpose of discussion, the process 400 will be described with reference to FIG. 1. The process 400 may involve the network device 110 and the terminal device 120 as illustrated in FIG. 1.

In the example process 400, the actions with the same reference signs (205, 210, 215) as those in FIG. 2 are similar with the corresponding actions described above with reference to FIG. 2 and thus description thereof will not be repeated. The network device 110 transmits 420 to the network device 120 the response including the identification of the network device 120, a further identification of the network device 110 and a credential for backhaul of the network 101. For example, the network device 110 may transmit 420 a probe response with its device serial number, the device serial number of the network device 120 and a backhaul credential in the vendor specific IE. The credential may include the Service Set Identification (SSID) of the backhaul of the network 101 and the corresponding password, the authentication scheme and the encryption scheme, for example.

After receiving the response, the network device 120 determines 425 whether the response matches its identification, for example its device serial number. If the response matches its identification, or in other words, if the response comprises the identification of the network device 120, the network device 120 may start an association procedure to be associated to the backhaul BSS of the network 101, for example the network device 120 may transmit an association request based on the received credential.

As illustratively shown in FIG. 4, an association procedure may be performed 430 between the existing network device 110 and the enrollee network device 120. Such a procedure may include association request/response to backhaul BSS, AP auto configuration search from the network device 120 to the network device 110, AP auto configuration response from the network device 110 to the network device 120, transmission of AP auto configuration Wi-Fi simple configuration (WSC) M1 from the network device 120 to the network device 110 and transmission of AP-Auto configuration WSC M2(s) w/Multi-AP extension sub-element from the network device 110 to the network device 120.

In this way, the times of interactions between the existing network device and the enrollee network device is reduced. As a result, the enrollee network device can be onboarded to the existing network in a more efficient way.

The coordination of existing network devices may or may not be applied to the credential mode. It is to be understood that in the case where the coordination of existing network devices is applied, the network device 110 involved in the process 400 is the one of the existing network devices 110-1, 110-2 and 110-3 which is selected to respond to the network device 120; in the case where the coordination of existing network devices is not applied, the network device 110 involved in the process 400 may be any one of the existing network devices 110-1, 110-2 and 110-3 which has received the request broadcast by the enrollee network device 120.

The network device(s) according to the present disclosure may support at least one mode of the onboarding procedure. If more than one mode (for example, the WPS event mode and the credential mode) is supported, the network device(s) is switchable between the supported modes. Moreover, after an enrollee network device (e.g., the network device 120) is onboarded to an existing network (e.g., the network 101), this enrollee network device may become a further existing network device and may perform the acts as described above with respect to the existing network device 110 in onboarding a further enrollee network device.

More details of the example embodiments in accordance with the present disclosure will be described with reference to FIGS. 5-6.

Figure 5:
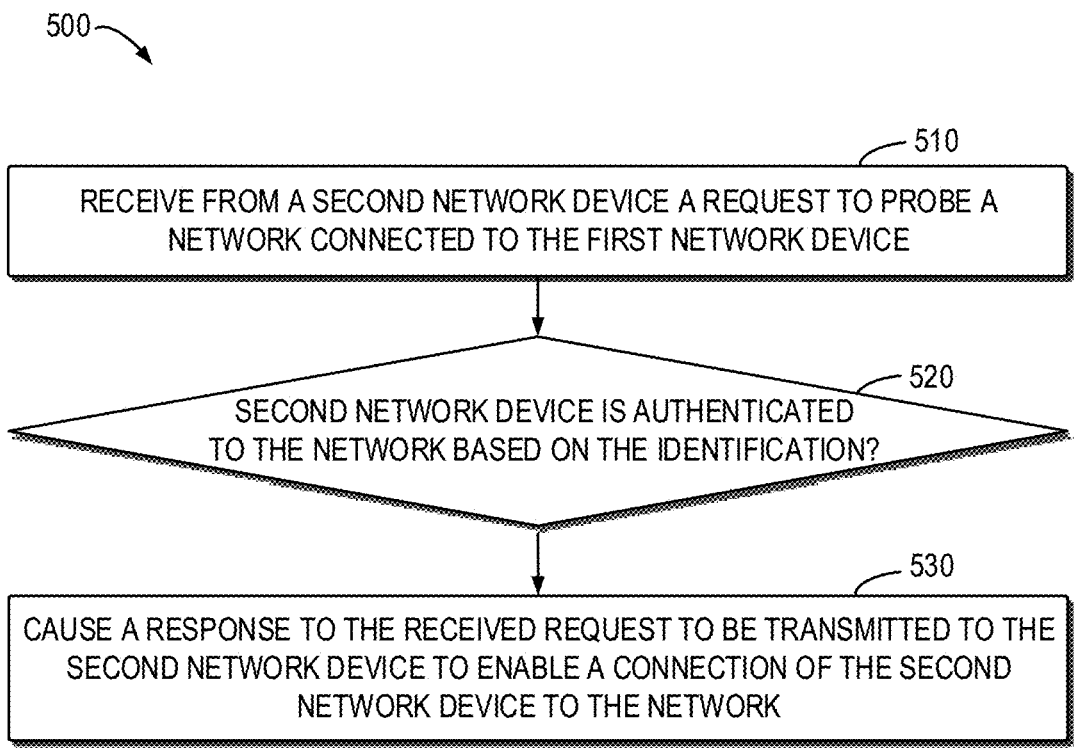
FIG. 5 illustrates a flowchart of an example method according to some embodiments of the present disclosure.

FIG. 5 shows a flowchart of an example method 500 according to some example embodiments of the present disclosure. The method 500 can be implemented at a device e.g. at the network device 110 as shown in FIG. 1. For the purpose of discussion, the method 500 will be described with reference to FIG. 1. For ease of discussion, the method 500 will be described below by taking the network device 110 of FIG. 1 as the first network device, and the network device 120 as the second network device.

At block 510, the first network device 110 receives from a second network device 120 a request to probe a network 101 connected to the first network device 110. The request comprises an identification of the second network device 120.

In some example embodiments, the identification of the second network device 120 may comprise at least one of: a group serial number of the second network device 120, or a device serial number of the second network device 120.

In some example embodiments, the identification of the second network device 120 may be comprised in a vendor specific information element of the request.

At block 520, the first network device 110 determines whether the second network device 120 is authenticated to the network 101 based on the identification.

In some example embodiments, the first network device 110 may obtain authentication information comprising a set of identifications of devices having been authenticated to the network 101. The authentication information may be generated at least partially by scanning of code associated with a device or enter of a serial number of a device. If the identification of the second network device 120 matches one of the set of identifications, the first network device 110 may determine that the second network device 120 is authenticated to the network 101.

If the first network device 110 determines that the second network device 120 is authenticated to the network 101, the method 500 proceeds to block 530. At block 530, the first network device 110 causes a response to the received request to be transmitted to the second network device 120 to enable a connection of the second network device 120 to the network 101.

In some example embodiments, the first network device 110 may cause the response to be transmitted to the second network device 120 by: transmitting the response to the second network device 120. The response may at least comprise the identification of the second network device 120.

In some example embodiments, for example in case where the first network device is the network device 110-2, transmitting the response to the second network device 120 may comprise: transmitting to a third network device (for example, the network device 110-1) an indication that the request has been received at the first network device 110-2, the first network device 110-2 being under control of the third network device 110-1; and in response to being controlled by the third network device 110-1 to respond to the second network device 120, transmitting the response to the second network device 120.

In some example embodiments, the first network device 110 (for example, the network device 110-1) may cause the response to be transmitted to the second network device 120 by: determining at least one candidate network device having also received the request and connected to the network 101, the at least one candidate network device being under control of the first network device; selecting a target network device from the at least one candidate network device and the first network device; and causing the target network device to transmit the response to the second network device 120.

In some example embodiments, the response further comprises a further identification of the first network device 110. The first network device 110 may perform a connection setup procedure between the first network device 110 and the second network device 120.

In some example embodiments, the response further comprises a credential for backhaul of the network 101. The first network device 110 may associate the second network device 120 to a Basic Service Set, BSS, for the backhaul of the network 101 based on the credential.

In some example embodiments, if at block 520 the first network device 110 determines that the second network device 120 is not authenticated to the network 101, the first network device 110 may discard the request.

Figure 6:
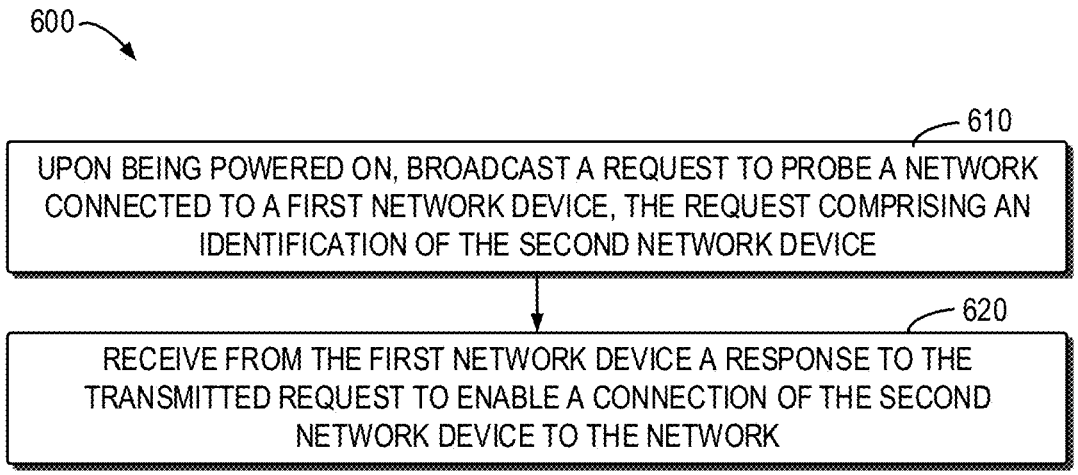
FIG. 6 illustrates a flowchart of an example method according to some embodiments of the present disclosure.

FIG. 6 shows a flowchart of an example method 600 according to some example embodiments of the present disclosure. The method 600 can be implemented at a device e.g. at the network device 120 as shown in FIG. 1. For the purpose of discussion, the method 600 will be described with reference to FIG. 1. For ease of discussion, the method 600 will be described below by taking the network device 110 of FIG. 1 as the first network device, and the network device 120 as the second network device.

At block 610, upon being powered on, the second network device 120 broadcasts a request to probe a network 101 connected to a first network device 110. The request may comprise an identification of the second network device 120.

In some example embodiments, the identification of the second network device 120 may comprise at least one of: a group serial number of the second network device 120, or a device serial number of the second network device 120.

In some example embodiments, the identification of the second network device 120 may be comprised in a vendor specific information element of the request.

At block 620, the second network device 120 receives from the first network device 110 a response to the transmitted request to enable a connection of the second network device 120 to the network 101. The response is transmitted in accordance with a determination that the second network device 120 is authenticated to the network 101.

In some example embodiments, if the response comprises the identification of the second network device 120 and a further identification of the first network device 110, the second network device 120 may further transmit to the first network device 110 a further request including the identification of the second network device 120 and the further identification of the first network device 110. The second network device 120 may then perform a connection setup procedure (for example, based on WPS) between the first network device and the second network device.

In some example embodiments, if the response comprises the identification of the second network device 120 and a credential for backhaul of the network 101, the second network device 120 may further transmit an association request to be associated to a Basic Service Set, BSS, for the backhaul of the network 101 based on the credential.

In some example embodiments, an apparatus capable of performing the method 500 may comprise means for performing the respective steps of the method 500. The means may be implemented in any suitable form. For example, the means may be implemented in a circuitry or software module.

In some example embodiments, an apparatus capable of performing the method 600 may comprise means for performing the respective steps of the method 600. The means may be implemented in any suitable form. For example, the means may be implemented in a circuitry or software module.

Figure 7:
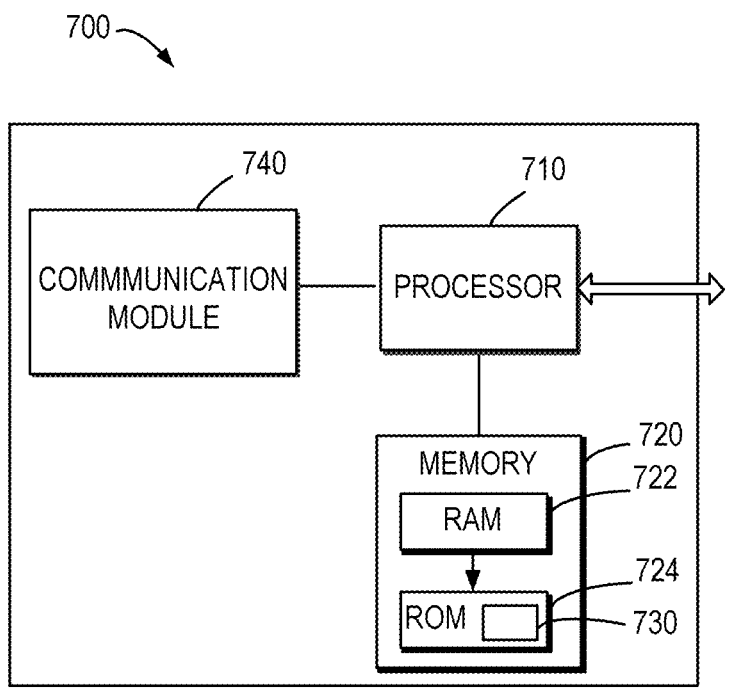
FIG. 7 illustrates a simplified block diagram of an apparatus that is suitable for implementing embodiments of the present disclosure.

FIG. 7 is a simplified block diagram of a device 700 that is suitable for implementing embodiments of the present disclosure. The device 700 may be provided to implement the communication device, for example the first network device 110 or the second network device 120 as shown in FIG. 1. As shown, the device 700 includes one or more processors 710, one or more memories 720 coupled to the processor 710, and one or more communication modules 740 coupled to the processor 710.

The communication module 740 is for bidirectional communications. The communication module 740 has at least one antenna to facilitate communication. The communication interface may represent any interface that is necessary for communication with other network elements.

The processor 710 may be of any type suitable to the local technical network and may include one or more of the following: general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

The memory 720 may include one or more non-volatile memories and one or more volatile memories. Examples of the non-volatile memories include, but are not limited to, a Read Only Memory (ROM) 724, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 722 and other volatile memories that will not last in the power-down duration.

A computer program 730 includes computer executable instructions that are executed by the associated processor 710. The program 730 may be stored in the ROM 720. The processor 710 may perform any suitable actions and processing by loading the program 730 into the RAM 720.

The embodiments of the present disclosure may be implemented by means of the program 730 so that the device 700 may perform any process of the disclosure as discussed with reference to FIGS. 5 to 6. The embodiments of the present disclosure may also be implemented by hardware or by a combination of software and hardware.

Figure 8:
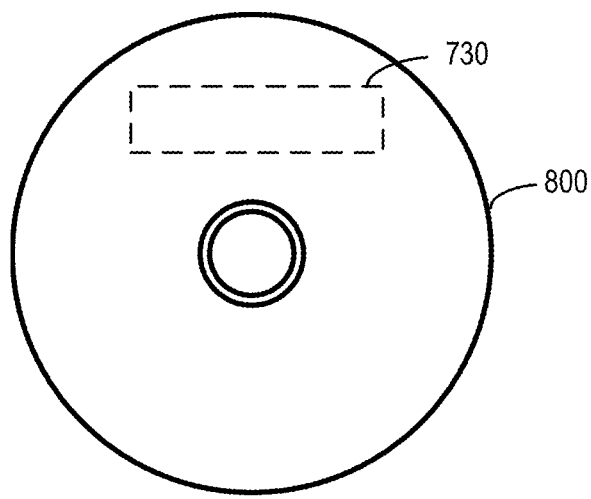
FIG. 8 illustrates a block diagram of an example computer readable medium in accordance with some embodiments of the present disclosure.

In some embodiments, the program 730 may be tangibly contained in a computer readable medium which may be included in the device 700 (such as in the memory 720) or other storage devices that are accessible by the device 700. The device 700 may load the program 730 from the computer readable medium to the RAM 722 for execution. The computer readable medium may include any types of tangible non-volatile storage, such as ROM, EPROM, a flash memory, a hard disk, CD, DVD, and the like. FIG. 8 shows an example of the computer readable medium 800 in form of CD or DVD. The computer readable medium has the program 730 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 500 or 600 as described above with reference to FIGS. 5-6. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first network device comprising:
   at least one processor; and
   at least one memory including computer program codes;
   the at least one memory and the computer program codes are configured to, with the at least one processor, cause the first network device at least to
      receive from a second network device a request to probe a network connected to the first network device, the request comprising an identification of the second network device, the identification of the second network device including a group serial number and a device serial number of the second network device;
      determine whether the second network device is authenticated to the network based on at least one of the group serial number and the device serial number of the second network device by
         obtaining authentication information comprising a set of identifications of devices having been authenticated to the network, and
         in accordance with a determination that the identification matches one of the set of identifications, determining that the second network device is authenticated to the network; and
      in accordance with the determination that the second network device is authenticated to the network, cause a response to the received request to be transmitted to the second network device to enable an onboarding connection of the second network device to the network by
         determining at least one candidate network device having also received the probe request from the second network device and connected to the network, the at least one candidate network device being under control of the first network device,
         selecting a target network device from the at least one candidate network device and the first network device based on signal qualities of the probe request received at the at least one candidate network device and the first network device, and causing the target network device to transmit the response to the second network device.

2. The first network device of claim 1, wherein the first network device is caused to cause the response to be transmitted to the second network device by:
   transmitting the response to the second network device, the response at least comprising the identification of the second network device.

3. The first network device of claim 2, wherein transmitting the response to the second network device comprising:
   transmitting to a third network device an indication that the request has been received at the first network device, the first network device being under control of the third network device; and
   in response to being controlled by the third network device to respond to the second network device, transmitting the response to the second network device.

4. The first network device of claim 2, wherein the response further comprises a further identification of the first network device, and the first network device is further caused to:
   in response to receiving from the second network device a further request including the identification and the further identification, perform an onboarding connection setup procedure between the first network device and the second network device.

5. The first network device of claim 2, wherein the response further comprises a credential for backhaul of the network, and the first network device is further caused to:
   associate the second network device to a Basic Service Set, BSS, for the backhaul of the network based on the credential.

6. The first network device of claim 1, wherein the identification of the second network device is comprised in a vendor specific information element of the request.

7. The first network device of claim 1, wherein the
   authentication information is generated at least partially by scanning of code associated with a device or enter of a serial number of a device.

8. The first network device of claim 1, wherein the first network device is further caused to:
   in accordance with the determination that the second network device is not authenticated to the network, discard the request.

9. A second network device comprising:
   at least one processor; and
   at least one memory including computer program codes;
   the at least one memory and the computer program codes are configured to, with the at least one processor, cause the second network device at least to
      upon being powered on, broadcast a request to probe a network connected to a first network device, the request comprising an identification of the second network device, the identification of the second network device including a group serial number and a device serial number of the second network device; and
      receive from a target network device a response to the broadcast request to enable an onboarding connection of the second network device to the network, the target network device selected from at least one candidate network device having also received the probe request from the second network device and connected to the network based on signal qualities of the probe request received at the at least one candidate network device and the first network device, the at least one network device being under control of the first network device, the response transmitted in accordance with a determination that the identification of the second network device matches authentication information comprising a set of identifications of devices having been authenticated to the network, and in accordance with the determination that the identification of the second network device matches one of the set of identifications the second network device is authenticated to the network based on at least one of the group serial number and the device serial number of the second network device.

10. The second network device of claim 9, wherein the second network device is further caused to:
in response to the response comprising the identification and a further identification of the first network device, transmit to the first network device a further request including the identification and the further identification; and
perform an onboarding connection setup procedure between the first network device and the second network device.

11. The second network device of claim 9, wherein the second network device is further caused to:
in response to the response comprising the identification and a credential for backhaul of the network, transmit an association request to be associated to a Basic Service Set, BSS, for the backhaul of the network based on the credential.

12. The second network device of claim 9, wherein the identification of the second network device is comprised in a vendor specific information element of the request.

13. A method of communication comprising:
receiving, at a first network device from a second network device, a request to probe a network connected to the first network device, the request comprising an identification of the second network device, the identification of the second network device including a group serial number and a device serial number of the second network device;
determining whether the second network device is authenticated to the network based on at least one of the group serial number and the device serial number of the second network device by
obtaining authentication information comprising a set of identifications of devices having been authenticated to the network, and
in accordance with a determination that the identification matches one of the set of identifications, determining that the second network device is authenticated to the network; and
in accordance with a determination that the second network device is authenticated to the network, causing a response to the received request to be transmitted to the second network device to enable an onboarding connection of the second network device to the network by
determining at least one candidate network device having also received the probe request from the second network device and connected to the network, the at least one candidate network device being under control of the first network device,
selecting a target network device from the at least one candidate network device and the first network device based on signal qualities of the probe request received at the at least one candidate network device and the first network device, and
causing the target network device to transmit the response to the second network device.

14. The method of claim 13, wherein causing the response to be transmitted to the second network device comprises:
transmitting the response to the second network device, the response at least comprising the identification of the second network device.

15. The method of claim 14, wherein transmitting the response to the second network device comprises:
transmitting to a third network device an indication that the request has been received at the first network device, the first network device being under control of the third network device; and
in response to being controlled by the third network device to respond to the second network device, transmitting the response to the second network device.

16. The method of claim 14, wherein the response further comprises a further identification of the first network device, and the method further comprises:
in response to receiving from the second network device a further request including the identification and the further identification, performing an onboarding connection setup procedure between the first network device and the second network device.

17. The method of claim 14, wherein the response further comprises a credential for backhaul of the network, and the method further comprises:
associating the second network device to a Basic Service Set, BSS, for the backhaul of the network based on the credential.

18. The method of claim 13, wherein the identification of the second network device is comprised in a vendor specific information element of the request.

19. The method of claim 13, wherein
the authentication information is generated at least partially by scanning of code associated with a device or enter of a serial number of a device.

20. The method of claim 13, wherein the method further comprises:
in accordance with a determination that the second network device is not authenticated to the network, discarding the request.

21. A method of communication comprising:
upon being powered on, broadcasting at a second network device a request to probe a network connected to a first network device, the request comprising an identification of the second network device, the identification of the second network device including a group serial number and a device serial number of the second network device; and
receiving from a target network device a response to the request to enable an onboarding connection of the second network device to the network, the target network device selected from at least one candidate network device having also received the probe request from the second network device and connected to the network based on signal qualities of the probe request received at the at least one candidate network device and the first network device, the at least one network device being under control of the first network device, the response transmitted in accordance with a determination that the identification of the second network device matches authentication information of the network comprising a set of identifications of devices having been authenticated to the network, and in accordance with the determination that the identification of the second network device matches one of the set of identifications the second network device is authenticated to the network based on at least one of the group serial number and the device serial number of the second network device.

22. The method of claim 21, wherein the method further comprises:
in response to the response comprising the identification and a further identification of the first network device, transmitting to the first network device a further request including the identification and the further identification; and
performing an onboarding connection setup procedure between the first network device and the second network device.

23. The method of claim 21, wherein the method further comprises:
in response to the response comprising the identification and a credential for backhaul of the network, transmitting an association request to be associated to a Basic Service Set, BSS, for the backhaul of the network based on the credential.

24. The method of claim 21, wherein the identification of the second network device is comprised in a vendor specific information element of the request.

25. A non-transitory computer readable medium storing machine-executable instructions thereon that, when executed, cause a machine to perform the method of claim 21.

26. An apparatus for communication comprising:
at least one processor and at least one memory including machine-executable instructions, the at least one memory and machine-executable instructions configured to, with the at least one processor, cause the apparatus to
receive, at a first network device from a second network device, a request to probe a network connected to the first network device, the request comprising an identification of the second network device, the identification of the second network device including a group serial number and a device serial number of the second network device;
determine whether the second network device is authenticated to the network based on at least one of the group serial number and the device serial number of the second network device by
obtaining authentication information comprising a set of identifications of devices having been authenticated to the network, and
in accordance with a determination that the identification matches one of the set of identifications, determining that the second network device is authenticated to the network; and
in accordance with a determination that the second network device is authenticated to the network, cause a response to the received request to be transmitted to the second network device to enable an onboarding connection of the second network device to the network by
determining at least one candidate network device having also received the probe request from the second network device and connected to the network, the at least one candidate network device being under control of the first network device,
selecting a target network device from the at least one candidate network device and the first network device based on signal qualities of the probe request received at the at least one candidate network device and the first network device, and
causing the target network device to transmit the response to the second network device.

27. An apparatus for communication comprising:
at least one processor and at least one memory including machine-executable instructions, the at least one memory and machine executable instructions configured to, with the at least one processor, cause the apparatus to
upon being powered on, broadcast at a second network device a request to probe a network connected to a first network device, the request comprising an identification of the second network device, the identification of the second network device including a group serial number and a device serial number of the second network device; and
receive from a target network device a response to the request to enable an onboarding connection of the second network device to the network, the target network device selected from at least one candidate network device having also received the probe request from the second network device and connected to the network based on signal qualities of the probe request received at the at least one candidate network device and the first network device, the at least one network device being under control of the first network device, the response transmitted in accordance with a determination that the identification of the second network device matches authentication information comprising a set of identifications of devices having been authenticated to the network, and in accordance with the determination that the identification of the second network device matches one of the set of identifications the second network device is authenticated to the network based on at least one of the group serial number and the device serial number of the second network device.

28. A non-transitory computer readable medium storing machine-executable instructions thereon that, when executed, cause a machine to perform the method of claim 13.

* * * * *